(12) United States Patent
Nakase et al.

(10) Patent No.: US 7,773,898 B2
(45) Date of Patent: Aug. 10, 2010

(54) IMAGE FORMING APPARATUS AND LINE WIDTH CORRECTION METHOD THEREFOR

(75) Inventors: Takahiro Nakase, Toride (JP); Naoyuki Yamamoto, Toride (JP); Masanobu Nakajima, Toride (JP)

(73) Assignee: Canon Kabushiki Kaisha (JP)

( * ) Notice: Subject to any disclaimer, the term of this patent is extended or adjusted under 35 U.S.C. 154(b) by 114 days.

(21) Appl. No.: 11/950,504

(22) Filed: Dec. 5, 2007

(65) Prior Publication Data

US 2008/0130061 A1 Jun. 5, 2008

(30) Foreign Application Priority Data

Dec. 5, 2006 (JP) ............................. 2006-328749

(51) Int. Cl.
*G03G 15/00* (2006.01)
*G03G 21/02* (2006.01)
*G06F 3/12* (2006.01)
*G06K 15/00* (2006.01)

(52) U.S. Cl. ............................. 399/49; 399/74; 358/1.1; 358/3.07

(58) Field of Classification Search .................. 358/1.1, 358/3.07; 399/49, 74, 139
See application file for complete search history.

(56) References Cited

U.S. PATENT DOCUMENTS

| 5,481,340 | A * | 1/1996 | Nagao et al. ................... 399/72 |
| 5,808,651 | A * | 9/1998 | Horiuchi ...................... 347/131 |
| 6,115,561 | A * | 9/2000 | Fukushima ................... 399/49 |
| 6,970,269 | B1 * | 11/2005 | Matsuoka ..................... 358/1.9 |
| 2004/0130737 | A1 * | 7/2004 | Kamimura et al. ........... 358/1.9 |
| 2005/0007609 | A1 * | 1/2005 | Itagaki et al. ................. 358/1.9 |

FOREIGN PATENT DOCUMENTS

JP          11-52636 A          2/1999

* cited by examiner

*Primary Examiner*—Benny Q Tieu
*Assistant Examiner*—Eric A Rust
(74) *Attorney, Agent, or Firm*—Rossi, Kimms & McDowell LLP

(57) ABSTRACT

This invention provides an image forming apparatus capable of outputting, without using any special device, an image which is free from changes in density and tint even upon crisscross rotation and exhibits good proportion of a small character. To accomplish this, the pulse width of a laser emission signal is controlled at 16 levels for one dot at 600 dpi, controlling an actual image in the main scanning direction. When adjusting vertical and horizontal line widths, patch data are created by rotating an anisotropic pattern through 0° and 90° (S1 in FIG. 5). Then, a reader/scanner (15) reads each patch as density data (S2 in FIG. 5). A pulse width, that is, line width correction value at which the densities of the patch patterns rotated through 0° and 90° become equal to each other is obtained (S3 in FIG. 5).

15 Claims, 12 Drawing Sheets

CORRECTION LEVEL 1

CORRECTION LEVEL 2

CORRECTION LEVEL 3

CORRECTION LEVEL 4

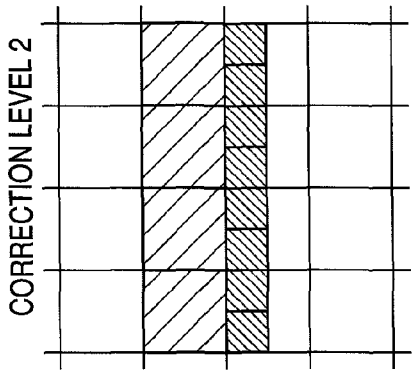
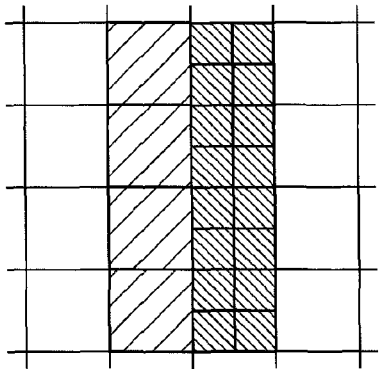
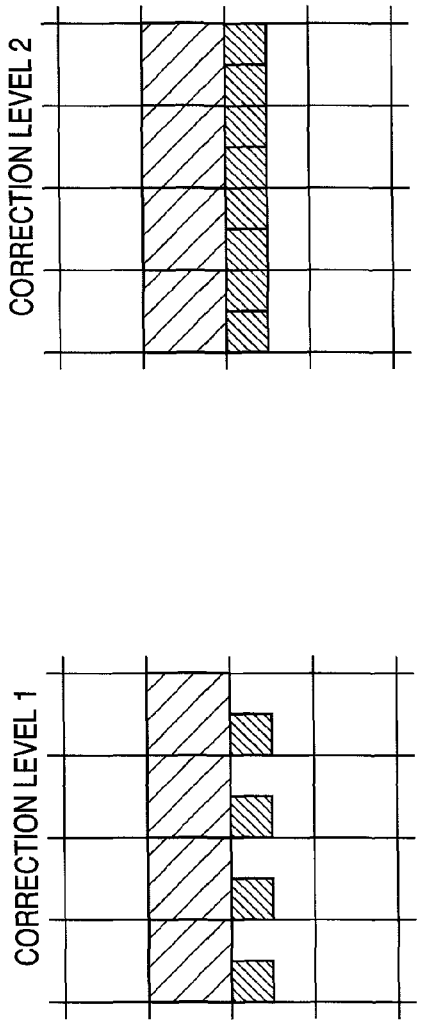
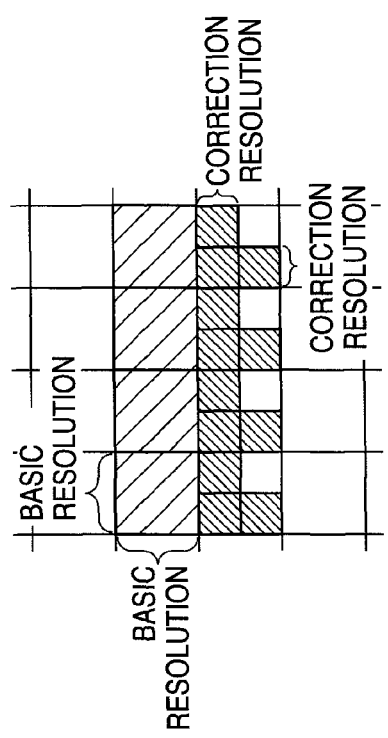

IMAGE FORMING APPARATUS AND LINE WIDTH CORRECTION METHOD THEREFOR

BACKGROUND OF THE INVENTION

1. Field of the Invention

The present invention relates to an image forming apparatus such as a printer, copying machine, or facsimile machine, and a line width correction method therefor.

2. Description of the Related Art

An electrophotographic image forming apparatus which electrostatically forms an image is known to suffer the difference between the line widths of the vertical and horizontal lines of a formed image owing to structural factors of the image forming apparatus. The vertical line means a straight line in the sub scanning direction perpendicular to the rotating shaft of a photosensitive drum. The horizontal line means a straight line parallel to the rotating shaft (i.e., main scanning direction) of the photosensitive drum.

Conventionally, the difference between the line widths of vertical and horizontal lines influences the proportion of a small character. This problem becomes more serious because recent digital printing allows free crisscross rotation of electronic data, and the direction of an image to be formed can be freely changed. That is, crisscross rotation is executed more frequently than conventional printing. Owing to the above-mentioned inherent factor, that is, the difference between the line widths of vertical and horizontal lines, the density and tint of a rotated image differ from those of an image which is not rotated.

To solve this problem, the median of the line width is adjusted by the spot diameter of a laser, the pulse width of a laser beam, or the settings of the developing device. In practice, however, the ratio of vertical and horizontal line widths often fails to be 1 due to variations in these and other conditions. To solve this, Japanese Patent Laid-Open No. 11-52636 discloses a method of measuring the size of an output image with respect to an image pattern and correcting the image in accordance with the measurement result.

However, the following problem arises when measuring the size of an output image with respect to an image pattern and correcting the image in an image forming apparatus having the above-described arrangement.

More specifically, the size of one dot at 600 dpi, which is most popularly used, is about 42 μm. To measure the line width itself for correction, a measurement sensor having a resolution of at least 10 μm or less is necessary. It is difficult in terms of cost and space and also technically difficult due to apparatus vibrations to arrange a sensor having a resolution of 10 μm or less in an actual image forming apparatus.

SUMMARY OF THE INVENTION

The present invention enables realization of an image forming apparatus capable of outputting, without using any special device, an image which is free from change in density and tint even upon crisscross rotation and exhibits good proportion of a small character, and a line width correction method therefor.

According to one aspect of the present invention, there is provided an image forming apparatus comprising: a patch image forming unit adapted to form at least one patch image at each of at least two angles by rotating an anisotropic pattern at the at least two angles; a density measurement unit adapted to measure a density of the patch image; and a line width correction unit adapted to correct a line width in at least one of a main scanning direction and a sub scanning direction in accordance with a measurement result of the density measurement unit.

According to another aspect of the present invention, there is provided a line width correction method for an image forming apparatus, comprising the steps of: forming at least one patch image at each of at least two angles by rotating an anisotropic pattern at the at least two angles; measuring a density of the patch image; and correcting a line width in at least one of a main scanning direction and a sub scanning direction in accordance with a measurement result in the density measuring step.

According to still another aspect of the present invention, there is provided an image forming apparatus forming an image by deflecting light beam emitted from light source unit by a deflector and scanning an image carrier, comprising: a patch image forming unit adapted to form a first patch image repetitively formed line image, formed in the main scanning direction, at predetermine interval in the sub scanning direction, and a second patch image formed line image, formed in the sub scanning direction, so as to neighbor at predetermine interval in the main scanning direction so as to at predetermine interval in the sub scanning direction; a density measurement unit adapted to measure a density of the first patch image and a density of the second patch image; and a line width correction unit adapted to correct a line width of the a main scanning direction so as to nearly equal the density of the first patch image and the density of the second patch image in accordance with a measurement result of the density measurement unit.

Further features of the present invention will be apparent from the following description of exemplary embodiments with reference to the attached drawings.

BRIEF DESCRIPTION OF THE DRAWINGS

FIGS. 10A to 10D are views of image patterns whose line widths are corrected in the sub scanning direction according to the second embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement and Operation of Image Forming Apparatus>

Figure 1:
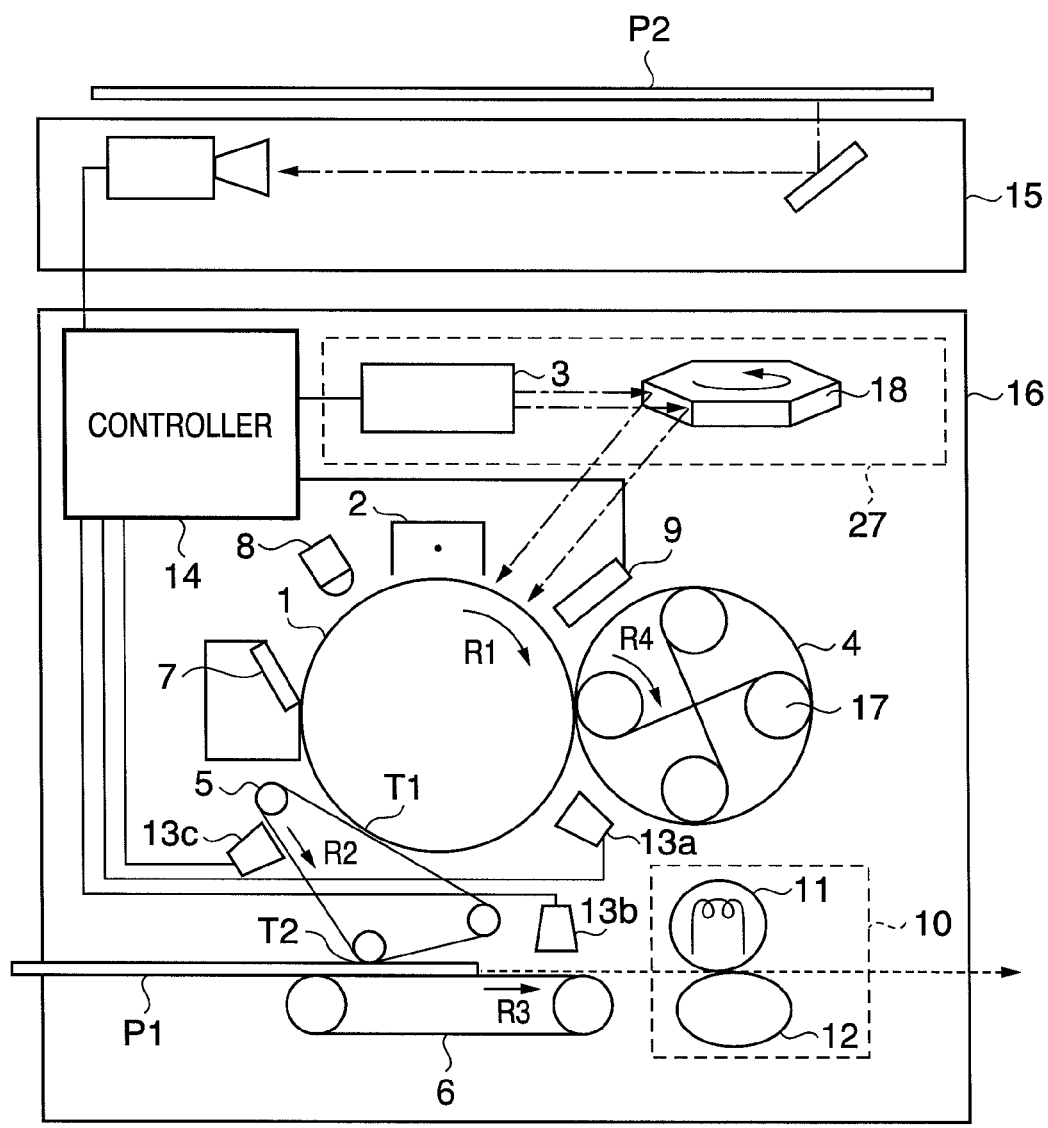
FIG. 1 is a longitudinal sectional view schematically showing the arrangement of the main part of an image forming apparatus according to the first embodiment.

FIG. 1 is a longitudinal sectional view schematically showing the arrangement of the main part of an image forming apparatus according to the first embodiment of the present invention.

The image forming apparatus shown in FIG. 1 comprises a reader/scanner 15 which reads an original image P2, and an image forming apparatus main body 16 which forms and outputs an image on a transfer medium P1 (e.g., paper or transparent film) based on an image signal output from the reader/scanner 15.

The image forming apparatus main body 16 electrophotographically forms an image, and comprises a drum type electrophotographic photosensitive body (to be referred to as a "photosensitive drum" hereinafter) serving as an image carrier. A photosensitive drum 1 is supported rotatably in a direction indicated by an arrow R1 by the image forming apparatus main body 16.

The photosensitive drum 1 is surrounded sequentially along its rotational direction by a primary charger 2, a laser scanner 27, a potential sensor 9, a developing unit 4, an intermediate transfer unit 5 which rotates in a direction indicated by an arrow R2, a cleaning unit 7, and a pre-exposure unit 8. An secondary transfer unit 6 which rotates in a direction indicated by an arrow R3 is arranged at a portion of the intermediate transfer unit 5 where paper passes. The image forming apparatus main body 16 also comprises a fixing unit 10 having a fixing roller 11 and press belt 12.

When forming an image in the image forming apparatus, the photosensitive drum 1 is driven to rotate by a driving means (not shown) at a predetermined process speed (peripheral speed) in the direction indicated by the arrow R1. The primary charger 2 uniformly charges the surface of the photosensitive drum 1 to a predetermined polarity and potential. A laser chip 3 in the laser scanner 27 serving as an exposure apparatus emits a beam based on an image signal supplied from an image forming controller 14. The scanning beam irradiates the charged surface of the photosensitive drum 1 via a rotating polygonal mirror (rotating polygonal mirror) 18.

Charges are removed from the irradiated portion on the surface of the photosensitive drum 1, forming an electrostatic latent image. Developing sleeves 17 serving as developer carriers in the developing unit 4 rotate in a direction indicated by an arrow R4. Then, toner attaches to the electrostatic latent image, developing the electrostatic latent image as a toner image. The developer is, for example, a mixture of a nonmagnetic two-component developer and a carrier.

Figure 2:
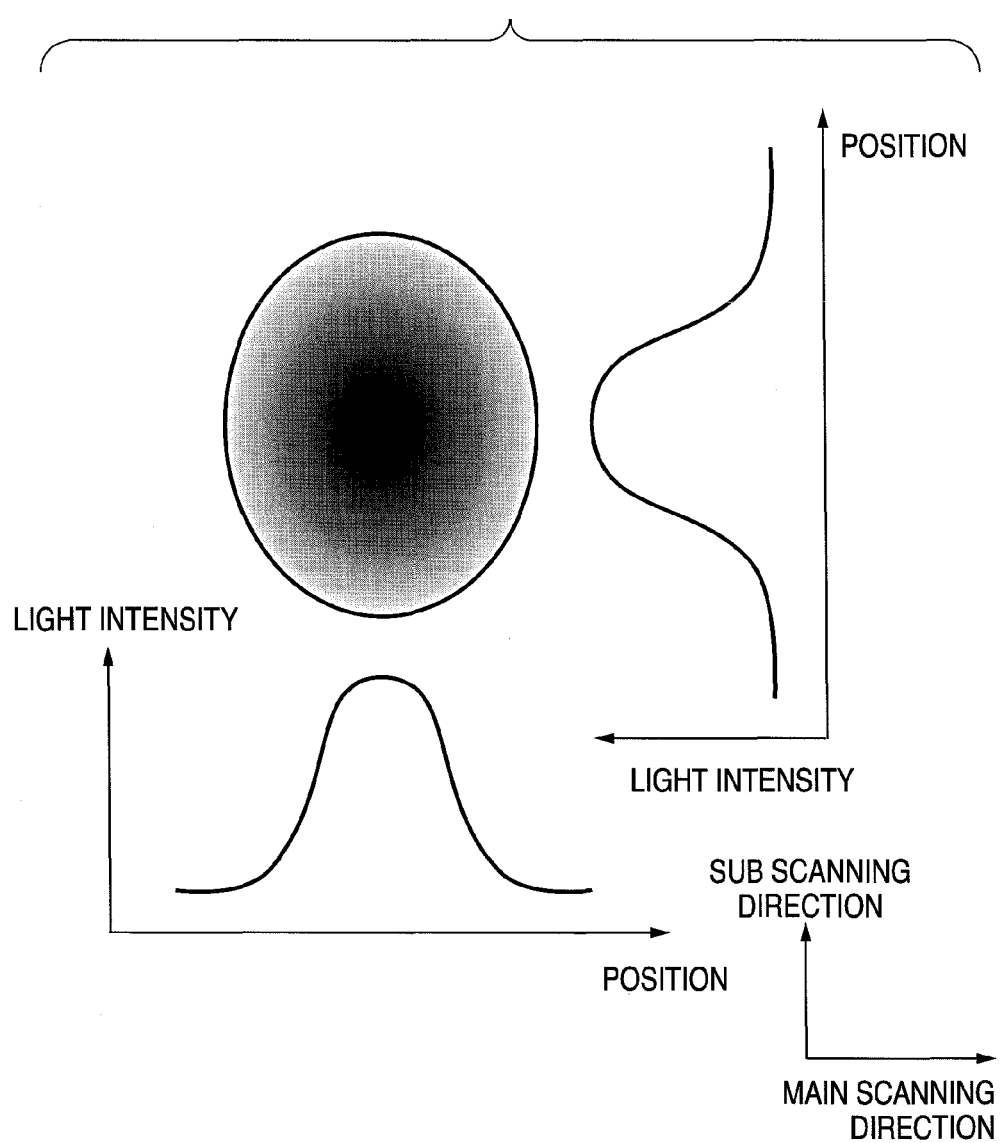
FIG. 2 is a graph of the light quantity distribution on a photosensitive drum.
Figure 3A:
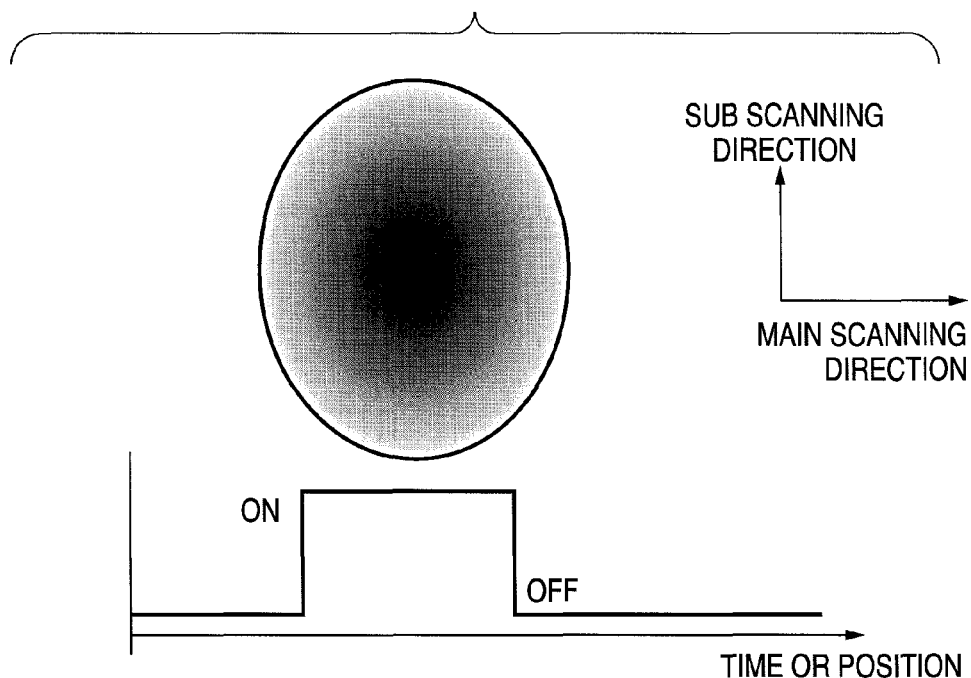
FIGS. 3A and 3B are conceptual charts showing the relationship between the emission time of a laser chip and the dot size on a photosensitive drum 1.
Figure 3B:
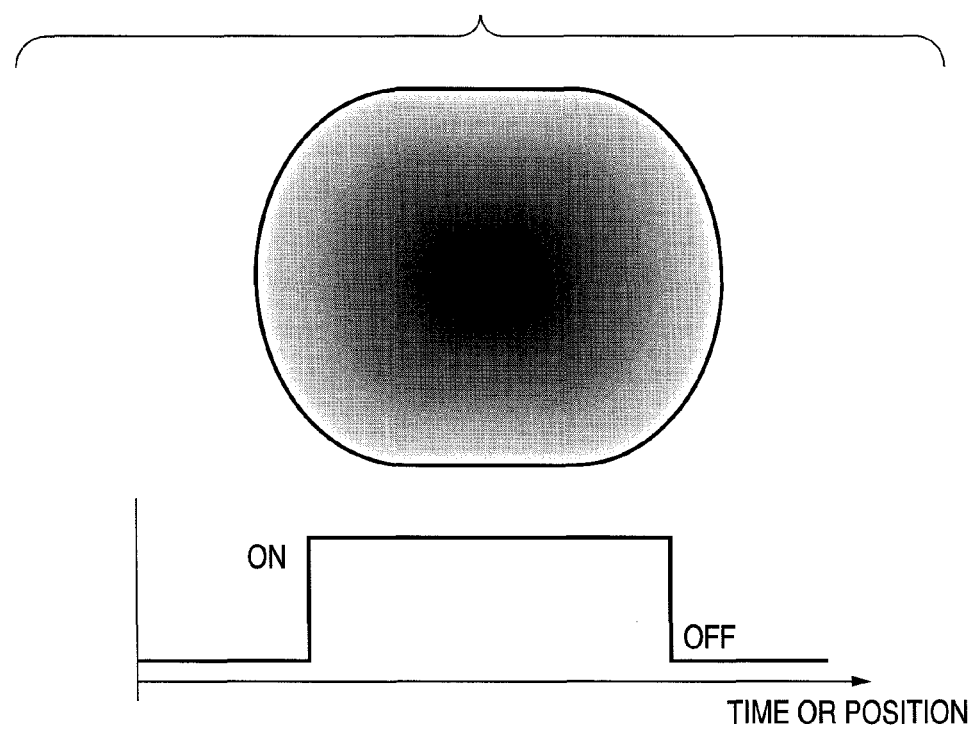

FIG. 2 is a graph of the light quantity distribution on the photosensitive drum 1. FIGS. 3A and 3B are conceptual charts showing the relationship between the emission time of the laser chip 3 and the dot size on the photosensitive drum 1.

Light emitted by the laser chip 3 passes through a stop unit, lens, and mirror (neither of them is shown) and the polygonal mirror 18, and reaches the photosensitive drum 1 as light having different vertical and horizontal sizes (spot diameters) on the Gaussian distribution, as shown in FIG. 2. A direction in which the surface of the photosensitive drum is repetitively exposed and scanned by the polygonal mirror 18 is defined as the main scanning direction (longitudinal direction of the photosensitive drum). A direction perpendicular to the main scanning direction is defined as the sub scanning direction (rotational direction of the photosensitive drum). In this case, the dot size on the photosensitive drum can be changed by changing the emission time of the laser chip 3 in the main scanning direction, as shown in FIGS. 3A and 3B.

However, depending on the rise/fall time of laser emission for a 1-dot image signal, the dot size changes vertically and horizontally and deviates from an ideal one on the photosensitive drum 1, development by the subsequent developing unit 4 or transfer by the transfer unit 5.

Figure 4:
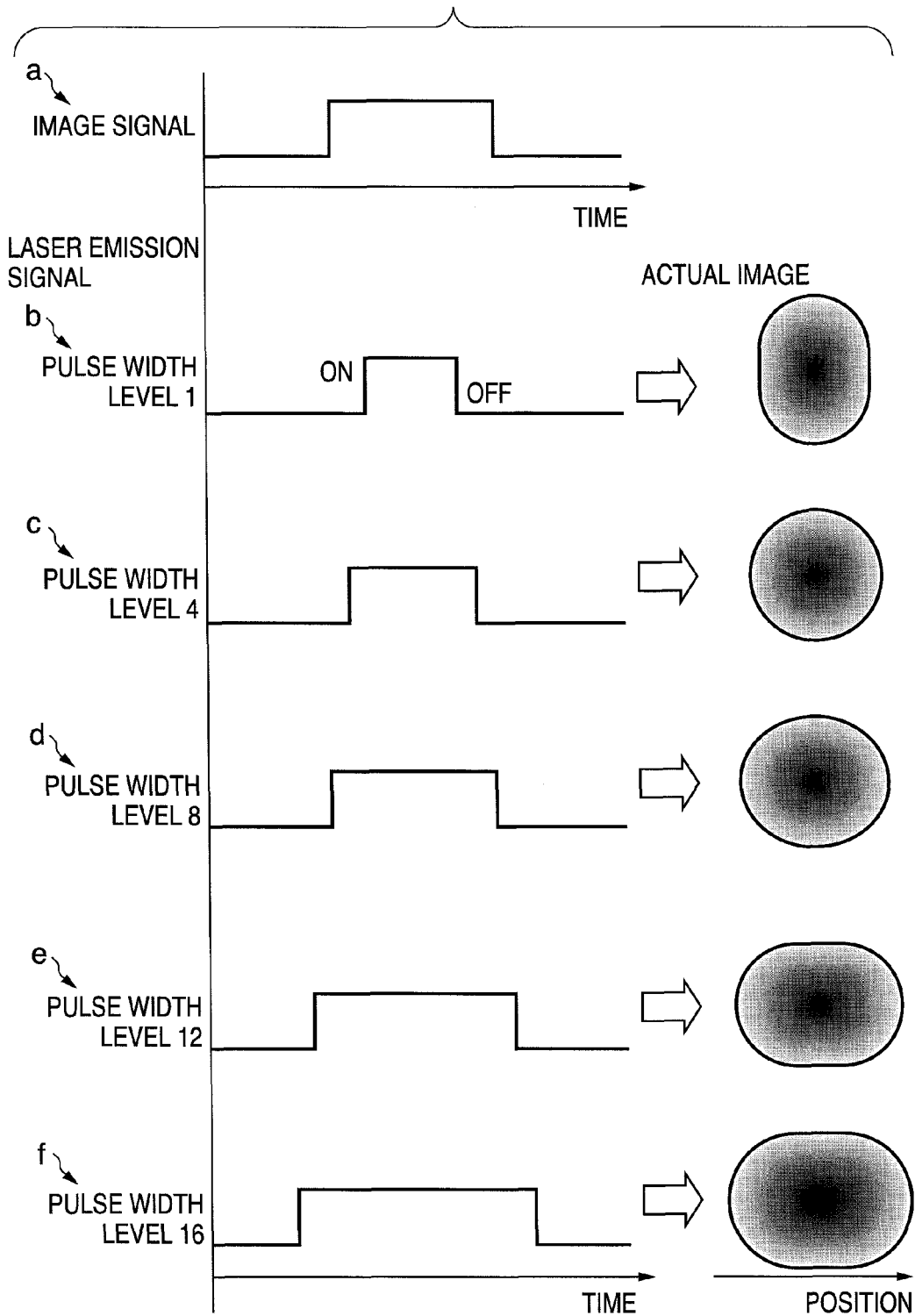
FIG. 4 is a conceptual chart showing control of the emission time for a 1-dot image signal.

FIG. 4 is a conceptual chart showing control of the emission time for a 1-dot image signal.

According to the first embodiment, to correct the shape of one dot, the pulse width of a laser emission signal, which corresponds to the emission time for a 1-dot image signal supplied from the image forming controller 14, is controlled at 16 levels for one dot (one pixel) at 600 dpi, as shown in FIG. 4. That is, the size of one dot is changed by changing the pulse width corresponding to the emission time at 16 stages for one dot. By this process, an actual image is controlled in the main scanning direction. The pulse width is controlled by a laser control board (not shown) arranged in the laser scanner 27 in accordance with an instruction from the image forming controller 14. The default pulse width is set to level 8.

A toner image formed on the photosensitive drum 1 reaches a first transfer portion T1 between the photosensitive drum 1 and the intermediate transfer unit 5 upon rotation of the photosensitive drum 1 in FIG. 1 in the direction indicated by the arrow R1. The toner image is transferred onto the intermediate transfer unit 5. To output an image in multiple colors by the rotary developing unit 4 as shown in FIG. 1, colors are superposed on the intermediate transfer unit 5.

In synchronism with the color toner image obtained by superposing colors, the transfer medium P1 is supplied to a transfer portion T2 which is a nip between the intermediate transfer unit 5 and the secondary transfer unit 6. Then, the toner image is transferred onto the transfer medium P1 by an electrostatic force generated by applying, from the transfer charger, a transfer bias having a polarity opposite to that of the intermediate transfer unit 5.

The transfer medium P1 bearing the toner image is conveyed to the fixing unit 10. The transfer medium P1 conveyed to the fixing unit 10 is heated and pressed when passing between the fixing roller 11 and the press belt 12, fixing the toner image onto the surface of the transfer medium P1. After that, the transfer medium P1 is discharged outside the image forming apparatus main body 16.

On the photosensitive drum 1 after transferring the toner image, the cleaning unit 7 removes toner left on the surface without being transferred at the first transfer portion T1. Further, the pre-exposure unit 8 removes charges left on the surface of the photosensitive drum 1, and the photosensitive drum 1 stands by for the next image formation.

<Correction of Vertical and Horizontal Line Widths>

Vertical/horizontal line width correction processing will be explained with reference to FIGS. 5 to 8B.

Figure 5:
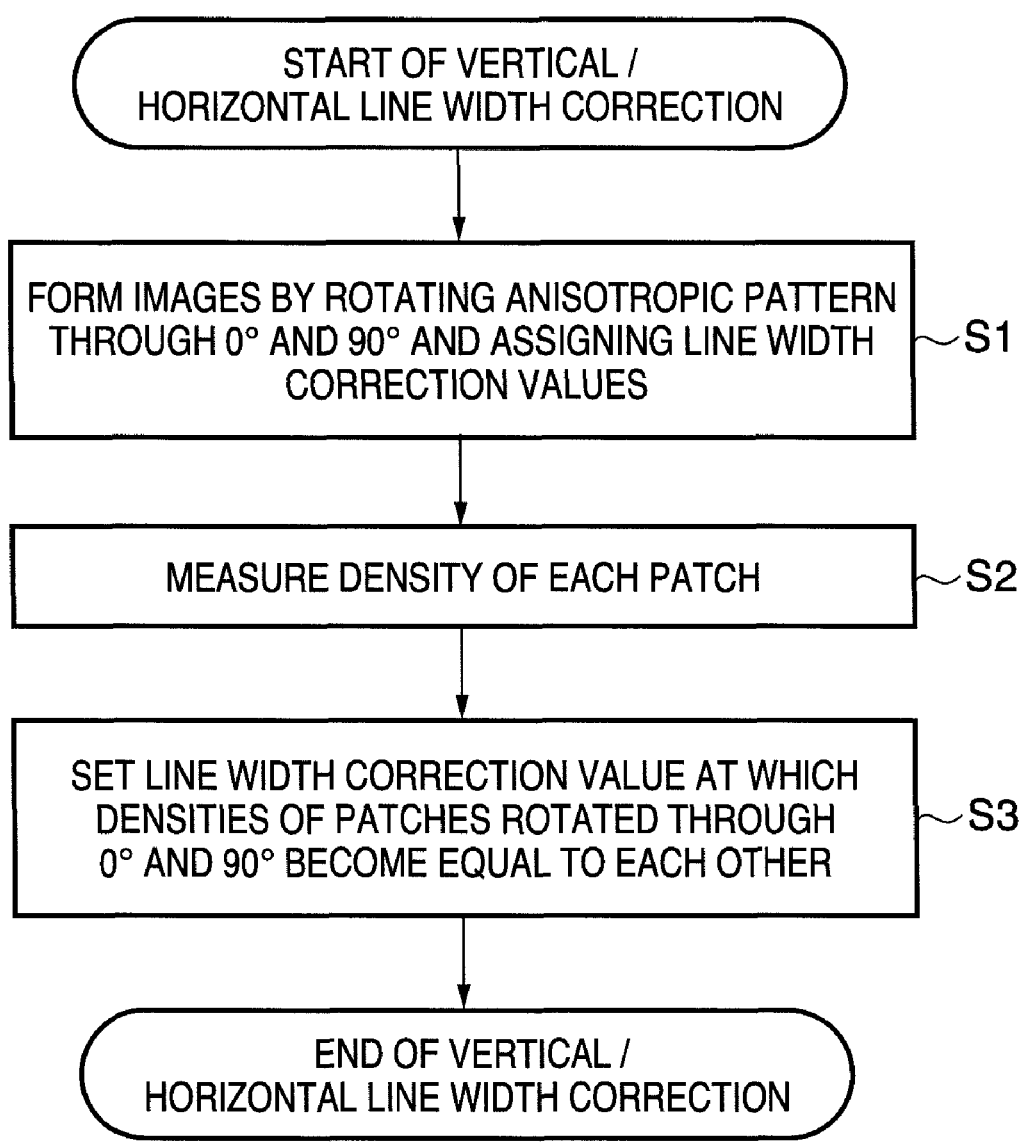
FIG. 5 is a flowchart showing vertical/horizontal line width correction processing.
Figure 6:
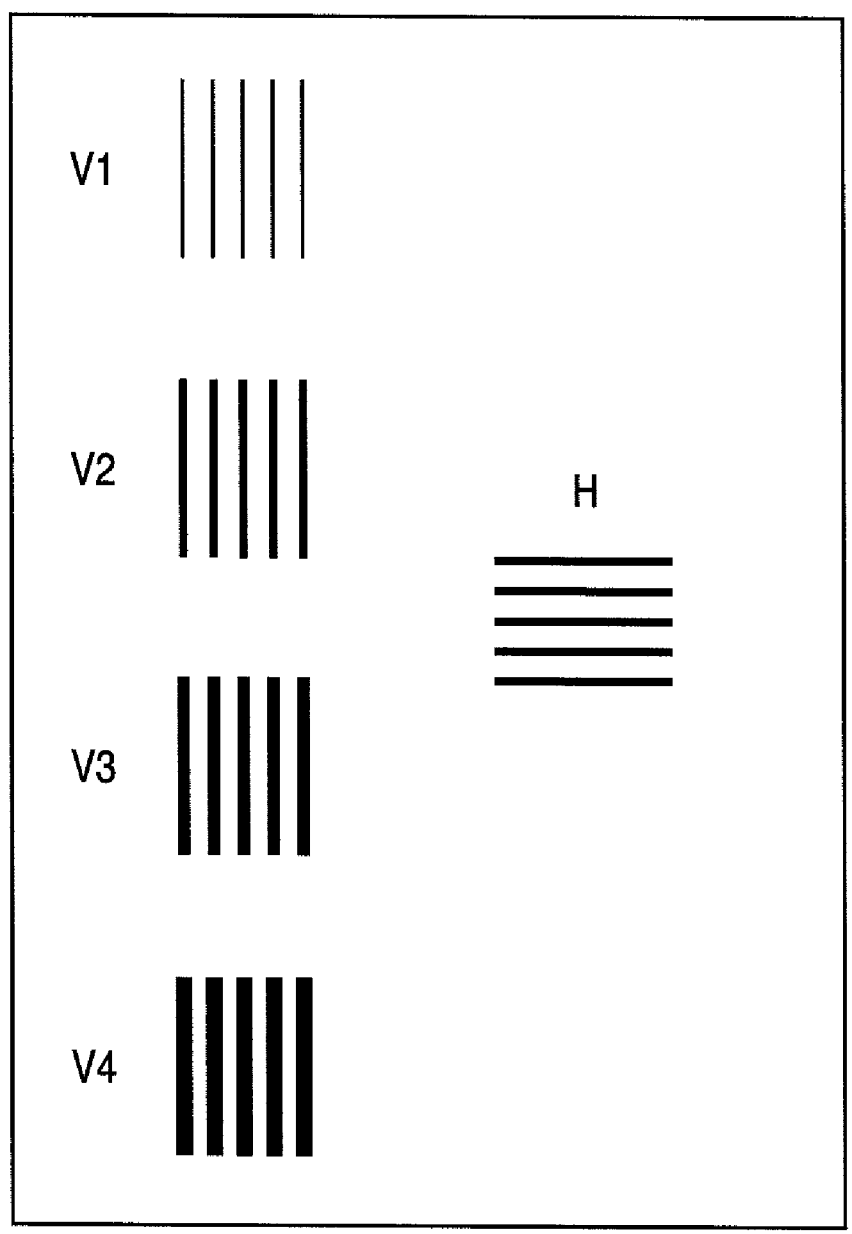
FIG. 6 is a schematic view of the pattern of patch images according to the first embodiment.
Figure 7:
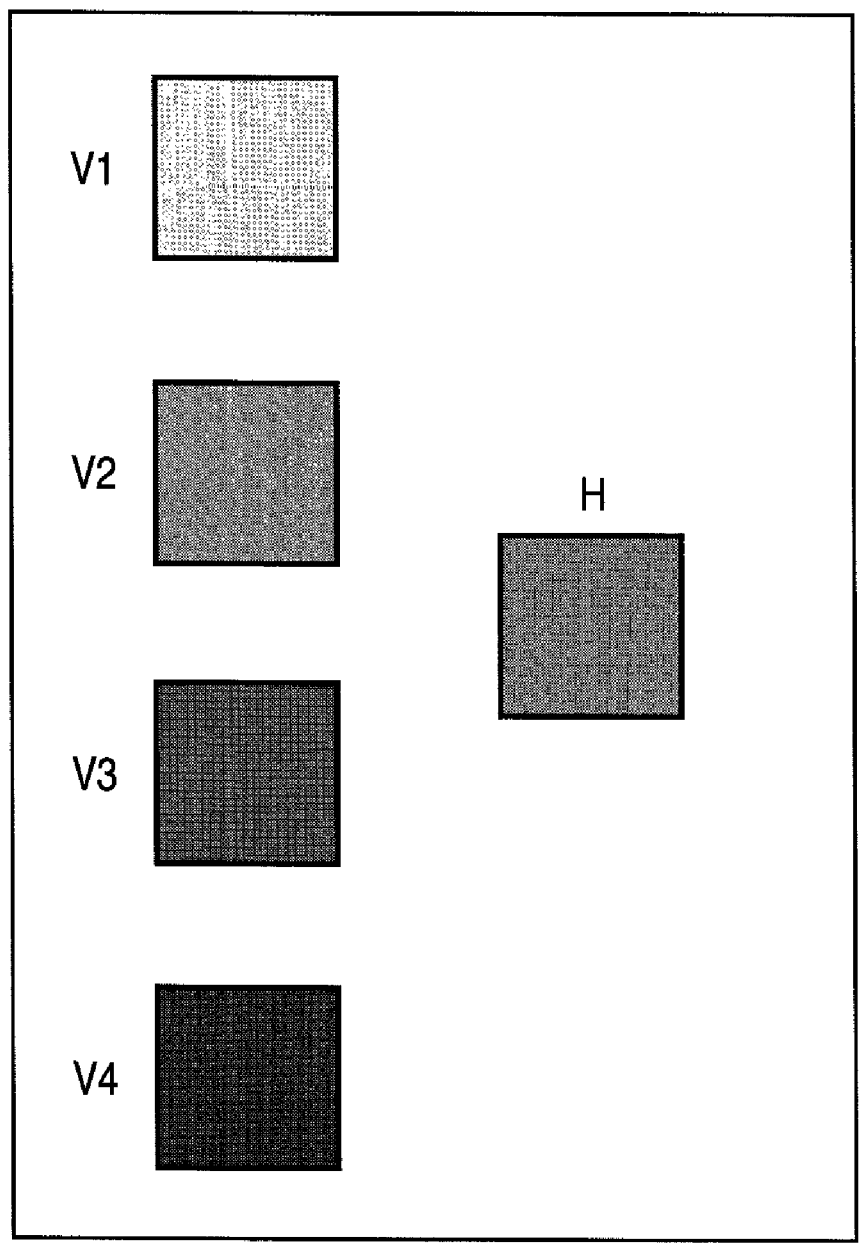
FIG. 7 is a view of visually checked patch images according to the first embodiment.
Figure 8A:
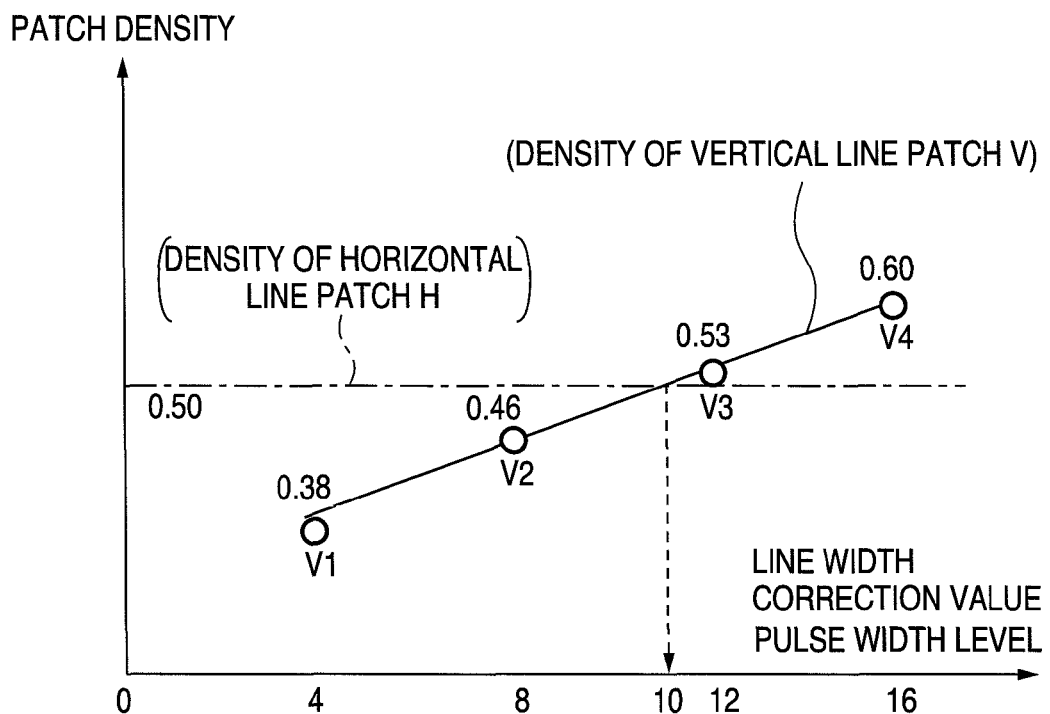
FIGS. 8A and 8B are graphs showing the line width correction value and density measurement result according to the first embodiment.
Figure 8B:
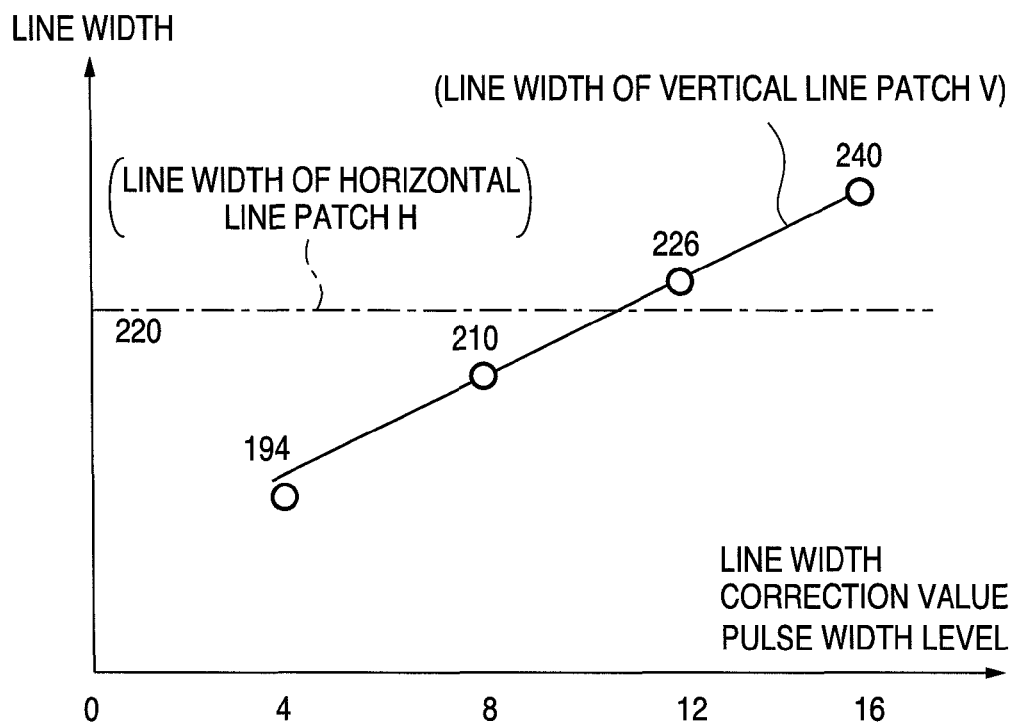
Figure 9A:
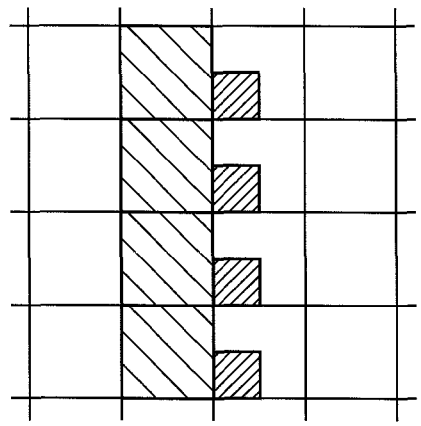
FIGS. 9A to 9D are views of image patterns whose line widths are corrected in the main scanning direction according to the second embodiment.
Figure 9B:
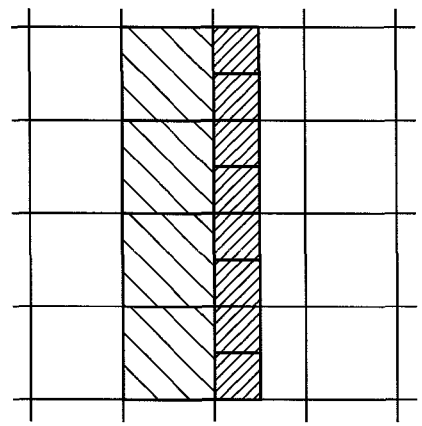
Figure 9C:
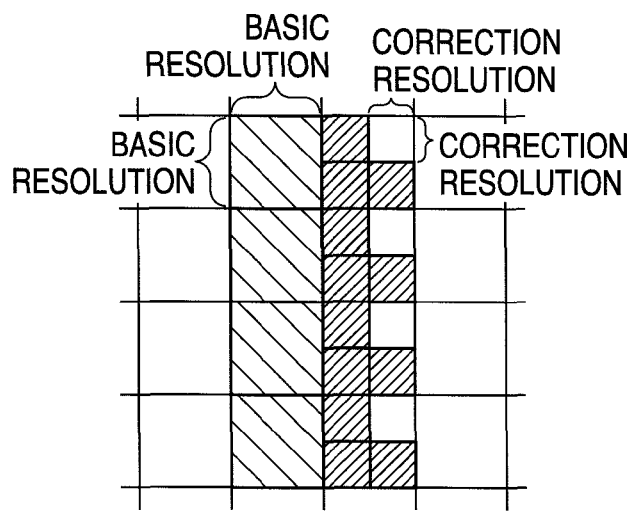
Figure 9D:
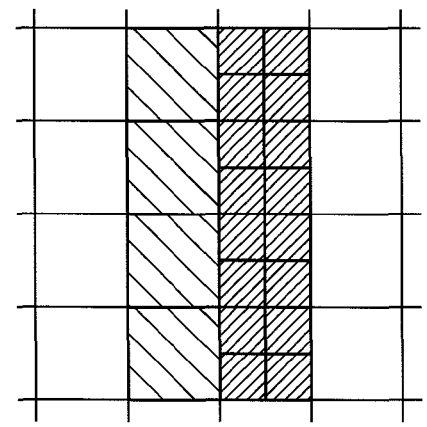

FIG. 5 is a flowchart showing vertical/horizontal line width correction processing executed by CPU comprised the image forming controller 14. FIG. 6 is a schematic view of the pattern of patch images according to the first embodiment. FIG. 7 is a view of visually checked patch images according to the first embodiment. FIGS. 8A and 8B are graphs showing the line width correction value and density measurement result according to the first embodiment.

First, the image forming controller 14 creates patch data as shown in FIG. 6. The patch data represents a pattern in which, for example, an image part of five lines width and a blank part of 10 lines extended to the sub scanning direction are repeated. From this patch data, one patch pattern H in FIG. 6 extended to the main scanning direction is created. As for patch patterns extended to the sub scanning direction, four patch patterns V1, V2, V3, and V4 in FIG. 6 are created. More specifically, the pulse width representing the line width correction value is changed to level 4, level 8, level 12, and level 16, and a total of four patch patterns V1, V2, V3, and V4 in FIG. 6 are formed for the respective levels.

The image forming controller 14 causes the laser chip 3 to emit light in accordance with these patch patterns and pulse widths, obtaining a patch output image by the above-described image forming operation. When viewed from a distance, the obtained patch output image seems to be a halftone image having different densities, as shown in FIG. 7 (step S1 in FIG. 5).

Then, the reader/scanner 15 reads the obtained patch output image. At this time, each pattern is read as density data, which is transmitted to the image forming controller 14. When the resolution of the reader/scanner 15 is high, it is also possible to integrate density data of dots within the range of the pattern, or decrease the reading resolution. The reading density is 0.50 for the patch pattern H, 0.38 for the patch pattern V1, 0.46 for the patch pattern V2, 0.53 for the patch pattern V3, and 0.60 for the patch pattern V4 (step S2 in FIG. 5).

The image forming controller 14 calculates an approximate straight line for the pulse width representing the line width correction value extended to the sub scanning direction based on the reading densities of the patch patterns V1 to V4, as shown in FIG. 8A. The image forming controller 14 obtains a pulse width at which the patch density becomes equal to that of the patch pattern H. Since the setting value of the obtained pulse width is level 10, the correction value is set to level 10 (step S3 in FIG. 5). That is, the default level "8" is changed to level 10.

The result as shown in FIG. 8B was obtained by measuring the line width of the patch output image by an external measurement apparatus different from the image forming apparatus. More specifically, the line width of the patch pattern H was 220 µm, that of the patch pattern V1 was 194 µm, that of the patch pattern V2 was 210 µm, that of the patch pattern V3 was 226 µm, and that of the patch pattern V4 was 240 µm. The line widths of vertical and horizontal lines were respectively corrected to 219 µm and 220 µm and became almost equal to each other.

<Advantages of First Embodiment>

(1) According to the first embodiment, an actual image is controlled in the main scanning direction by controlling the pulse width of a laser emission signal, which corresponds to the emission time for a 1-dot image signal, at, for example, 16 levels for one dot at 600 dpi. When adjusting vertical and horizontal line widths, patch data (FIG. 6) are created by rotating an anisotropic pattern through 0° and 90° (S1 in FIG. 5). At this time, patch patterns extended to the sub scanning direction are formed by changing the pulse width representing the line width correction value to levels 4, 8, 12, and 16. Then, the reader/scanner 15 reads each patch as density data (S2 in FIG. 5). A pulse width, that is, line width correction value at which the densities of the patch patterns rotated through 0° and 90° become equal to each other is obtained (S3 in FIG. 5).

By correcting the laser emission time in the main scanning direction for one dot in this manner, even if the user executes crisscross rotation of a paper original or electronic original, neither the density difference nor tint difference occurs when viewed from a distance. The vertical and horizontal line widths are also corrected. In other words, the vertical and horizontal line widths are respectively corrected to 219 µm and 220 µm and become almost equal to each other. The proportion of a small character improves.

(2) As for the angles through which a patch pattern is rotated, when one patch pattern angle is set to 0°, the other angle is set to 90°. This setting facilitates calculation of vertical and horizontal line width correction values. The angle may be arbitrarily set in accordance with the type of image and the rotation angle of the image.

(3) When a direction parallel to the main scanning direction is set to 0°, a pattern long in the direction of 0° or 90° is defined as a basic patch pattern, as shown in FIG. 6. With this setting, the difference between vertical and horizontal line widths can be corrected at high precision. Therefore, a comparison in predetermine area becomes possible.

(4) As shown in FIG. 6, a density measurement patch output image is formed from simple, parallel and equally spaced lines in the main scanning direction and those in the sub scanning direction. The difference between vertical and horizontal line widths can be corrected at higher precision by density measurement.

(5) Since the pulse width of the laser is used as the line width correction value in the main scanning direction, the line width can be finely corrected in the main scanning direction. In this case, the line width is adjusted in the main scanning direction by using (without changing) the width in the sub scanning direction as a reference.

(6) Since the reader/scanner 15 is used as a means for reading a patch output image, the line width can be corrected without using any special device.

(7) Since a plurality of patches are formed by changing the line width correction value and an optimal value is calculated from the result of density measurement, the line width can be corrected at once at high precision.

Second Embodiment

An image forming apparatus according to the second embodiment can form an image pattern at a resolution higher than the basic resolution of image data. As a means for reading the density of a patch output image, the image forming apparatus adopts a patch sensor 13a instead of the reader/scanner 15. The basic arrangement of the image forming apparatus is the same as that in the first embodiment. The image forming apparatus according to the second embodiment will be described with reference to FIGS. 9A to 12.

Figure 11:
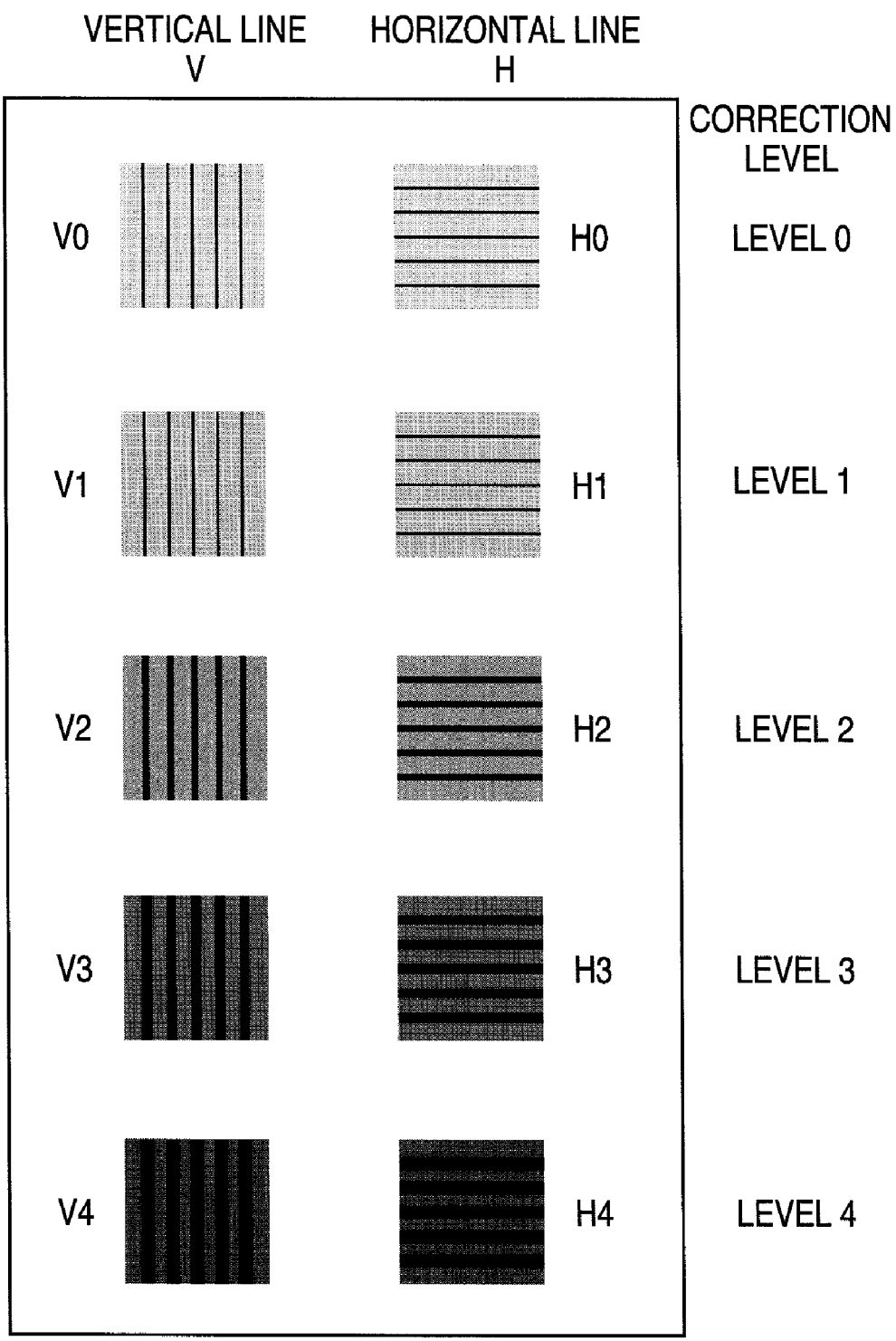
FIG. 11 is a schematic view of a patch pattern according to the second embodiment.
Figure 12:
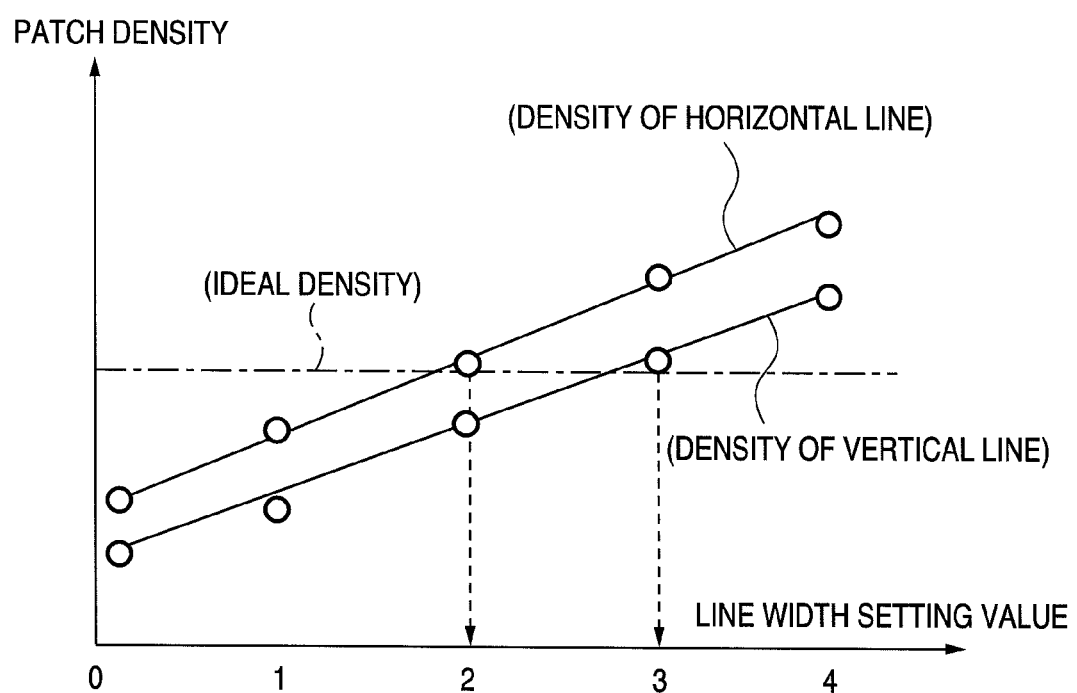
FIG. 12 is a graph showing the line width correction value and density measurement result according to the second embodiment.

FIGS. 9A to 9D are views of image patterns whose line widths are corrected in the main scanning direction according to the second embodiment. FIGS. 10A to 10D are views of image patterns whose line widths are corrected in the sub scanning direction according to the second embodiment. FIG. 11 is a schematic view of a patch pattern according to the second embodiment. FIG. 12 is a graph showing the line width correction value and density measurement result according to the second embodiment.

In the image forming apparatus of the second embodiment, a reader/scanner 15 reads an image at 600 dpi, and the basic resolution of image data is 600 dpi. An image forming controller 14 and laser scanner 27 can form an image at 1,200 dpi, and have a line width correction resolution of 1,200 dpi. As line width correction, dots can be added at four levels in the main scanning direction, as shown in FIGS. 9A to 9D. Also, dots can be added at four levels in the sub scanning direction, as shown in FIGS. 10A to 10D.

As shown in FIG. 11, patch patterns of vertical lines and those of horizontal lines are respectively formed on a photosensitive drum 1 at five stages corresponding to level 0, at which no correction is done, and correction levels 1 to 4. The patch sensor 13*a* in FIG. 1 measures the density of each patch pattern, and transmits data to the image forming controller 14.

It is known that an ideal density obtained before forming the patch pattern is 0.48. This value is stored in the image forming controller 14. As shown in FIG. 12, the image forming controller 14 calculates correction levels closest to the ideal density from the densities of vertical and horizontal lines at the respective levels. As a result, the closest correction levels are level 2 for the vertical line (correction in the main scanning direction) and level 3 for the horizontal line (correction in the sub scanning direction).

<Advantages of Second Embodiment>

(1) According to the second embodiment, the patch sensor 13*a* in FIG. 1 reads the density of a patch output image. This allows correcting the line width by only processing within the main body without outputting an image. In other words, the line width can be adjusted without using any transfer medium or bothering the user or serviceman to read an output by the reader/scanner 15.

In the second embodiment, the patch sensor detects the surface of the photosensitive drum 1. The patch sensor may also be arranged on an secondary transfer unit 6 or intermediate transfer unit 5 as represented by positions 13*b* and 13*c* in FIG. 1. By measuring a patch formed on a transfer medium P1 as in a case where the patch sensor is arranged at the position 13*b* in FIG. 1, a measurement value close to that obtained when outputting an image can also be attained.

(2) As a means for forming an image pattern at a resolution higher than the basic resolution of image data, the image forming apparatus comprises the image forming controller 14 and laser scanner 27. Since the line width is corrected by correcting an image pattern formed at high resolution, the line width can be reliably corrected in both the main and sub scanning directions (see FIGS. 9A to 9D and 10A to 10D).

Third Embodiment

In the third embodiment, the user visually compares densities and inputs a correction value. The arrangement of an image forming apparatus in the third embodiment is basically the same as that in the first embodiment. However, the image forming apparatus does not comprise a density measurement means such as the reader/scanner or patch sensor.

Similar to the first embodiment, a patch output image as shown in FIG. 6 is output from an image forming apparatus main body 16. When the patch output image is visually checked at a distance of, for example, about 30 cm from the paper surface, it seems to be a halftone image having different densities, as shown in FIG. 7.

The user searches patch patterns V1 to V4 for a halftone patch pattern having a density closest to that of a patch pattern H. In the example of FIG. 7, the density of the patch pattern V3 is closest to that of the patch pattern H, so the user inputs a correction value "3" to the operation unit. An image forming controller 14 sets the pulse width to level 12 corresponding to the patch pattern V3 for a reader/scanner 15.

<Advantage of Third Embodiment>

According to the third embodiment, the user visually compares densities and manually inputs a correction value. This prevents generation of the density difference when viewed from a distance even if the user executes crisscross rotation of a paper original or electronic original in an image forming apparatus having no density measurement device, like a low-end printer. The vertical and horizontal line widths satisfactorily become almost equal to each other, and the proportion of a small character improves.

The object of the present invention is also achieved by supplying a storage medium which stores software program codes for implementing the functions of the above-described embodiments to a system or apparatus, and reading out and executing the program codes by the computer of the system or apparatus.

In this case, the program codes read out from the storage medium implement the functions of the above-described embodiments, and the program codes and the storage medium which stores the program codes constitute the present invention.

The storage medium for supplying the program codes includes a Floppy® disk, hard disk, magnetooptical disk, optical disk (e.g., CD-ROM, CD-R, CD-RW, DVD-ROM, DVD-RAM, DVD-RW, or DVD+RW), magnetic tape, nonvolatile memory card, and ROM. The program codes may also be downloaded via a network.

The functions of the above-described embodiments are implemented by executing the readout program codes by the computer. Also, the present invention includes a case where an OS (Operating System) or the like running on the computer performs part or all of actual processing based on the instructions of the program codes and thereby implements the functions of the above-described embodiments.

According to the present invention, an image which is free from change in density and tint even upon crisscross rotation and exhibits good proportion of a small character can be output without using any special device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328749 filed on Dec. 5, 2006, which is hereby incorporated by reference herein in its entirety.

What is claimed is:

1. An image forming apparatus comprising:
   an image forming unit comprising a photosensitive member, a light source for emitting a light beam, a light source driving unit for causing the light source to emit the light beam, a deflecting scanning unit for scanning the light beam emitted from the light source, and a developing unit for developing an electrostatic latent image formed, on the photosensitive member, by the scanned light beam as a toner image;
   a control unit configured to cause the image forming unit to form a first toner pattern including multiple lines which extend to a first direction being a direction where the light beam is scanned and a second toner pattern including multiple lines which extend to a second direction being different from the first direction based on predetermined pattern image data;
   a reading unit configured to read the first toner pattern and the second toner pattern formed on the photosensitive member; and
   a correction unit configured to detect densities of the first toner pattern and the second toner pattern based on results of the reading by the reading unit, to generate correction data so that the densities of lines formed in the first direction and the second direction are equal or nearly equal, and to correct input image data based on the correction data;
   wherein the light source driving unit emits the light beam from the light source based on the input image data corrected by the correction unit.

2. The apparatus according to claim 1, wherein the second direction is a direction where the first direction is rotated by 90°.

3. The apparatus according to claim 2, wherein the first toner pattern is formed by multiple lines parallel to a scanning direction of the light beam, and the second toner pattern is formed by multiple lines perpendicular to the scanning direction of the light beam.

4. The apparatus according to claim 1, wherein the light source driving unit causes the light source to the light beam based on pulse signal of the input image data corrected by the correction unit, and the correction unit controls a pulse width of the pulse signal based on the correction data.

5. The apparatus according to claim 1, wherein the image forming unit is capable of forming by different resolutions, and resolutions of the first toner pattern and the second toner pattern formed by the image forming unit are higher than a resolution of an image formed by the image forming unit based on the input image data.

6. An image forming apparatus comprising:

an image forming unit comprising a photosensitive member, a light source for emitting a light beam, a light source driving unit for causing the light source to emit the light beam, a deflecting scanning unit for scanning the light beam emitted from the light source, a developing unit for developing an electrostatic latent image formed, on the photosensitive member, by the scanned light beam as a toner image, and a transfer unit for transferring the toner image formed on the photosensitive member to a printing medium via a intermediate transfer member;

a control unit configured to cause the image forming unit to form a first toner pattern including multiple lines which extend to a first direction being a direction where the light beam is scanned and a second toner pattern including multiple lines which extend to a second direction being different from the first direction based on predetermined pattern image data;

a reading unit configured to read the first toner pattern and the second toner pattern transferred on the intermediate transfer member or the printing medium; and a correction unit configured to detect densities of the first toner pattern and the second toner pattern based on results of the reading by the reading unit, to generate correction data so that the densities of lines formed in the first direction and the second direction are equal or nearly equal, and to correct input image data based on the correction data;

wherein the light source driving unit emits the light beam from the light source based on the input image data corrected by the correction unit.

7. The apparatus according to claim 6, wherein the second direction is a direction where the first direction is rotated by 90°.

8. The apparatus according to claim 7, wherein the first toner pattern is formed by multiple lines parallel to a scanning direction of the light beam, and the second toner pattern is formed by multiple lines perpendicular to the scanning direction of the light beam.

9. The apparatus according to claim 6, wherein the light source driving unit causes the light source to the light beam based on pulse signal of the input image data corrected by the correction unit, and the correction unit controls a pulse width of the pulse signal based on the correction data.

10. The apparatus according to claim 6, wherein the image forming unit is capable of forming by different resolutions, and resolutions of the first toner pattern and the second toner pattern formed by the image forming unit are higher than a resolution of an image formed by the image forming unit based on the input image data.

11. An image forming apparatus comprising:

an image forming unit comprising a photosensitive member, a light source for emitting a light beam, a light source driving unit for causing the light source to emit the light beam, a deflecting scanning unit for scanning the light beam emitted from the light source, a developing unit for developing an electrostatic latent image formed, on the photosensitive member, by the scanned light beam as a toner image, a transfer unit for transferring the toner image formed on the photosensitive member to a printing medium, and a fixing unit for fixing the transferred toner image to the printing medium;

a control unit configured to cause the image forming unit to form a first toner pattern including multiple lines which extend to a first direction being a direction where the light beam is scanned and a second toner pattern including multiple lines which extend to a second direction being different from the first direction based on predetermined pattern image data;

a reading unit configured to read the first toner pattern and the second toner pattern fixed to the printing medium by the fixing unit; and a correction unit configured to detect densities of the first toner pattern and the second toner pattern based on results of the reading when the reading unit reads the first toner pattern and the second toner pattern fixed, to the printing medium, by the fixing unit, to generate correction data so that the densities of lines formed in the first direction and the second direction are equal or nearly equal, and to correct input image data based on the correction data;

wherein the light source driving unit emits the light beam from the light source based on the input image data corrected by the correction unit.

12. The apparatus according to claim 11, wherein the second direction is a direction where the first direction is rotated by 90°.

13. The apparatus according to claim 12, wherein the first toner pattern is formed by multiple lines parallel to a scanning direction of the light beam, and the second toner pattern is formed by multiple lines perpendicular to the scanning direction of the light beam.

14. The apparatus according to claim 11, wherein the light source driving unit causes the light source to the light beam based on pulse signal of the input image data corrected by the correction unit, and the correction unit controls a pulse width of the pulse signal based on the correction data.

15. The apparatus according to claim 11, wherein the image forming unit is capable of forming by different resolutions, and resolutions of the first toner pattern and the second toner pattern formed by the image forming unit are higher than a resolution of an image formed by the image forming unit based on the input image data.

* * * * *